No. 769,601. PATENTED SEPT. 6, 1904.
J. A. FERGUSON.
MOLD FOR BUILDING BLOCKS.
APPLICATION FILED DEC. 15, 1903.
NO MODEL.

WITNESSES: John Albert Ferguson INVENTOR.

No. 769,601. Patented September 6, 1904.

UNITED STATES PATENT OFFICE.

JOHN ALBERT FERGUSON, OF DENVER, COLORADO.

MOLD FOR BUILDING-BLOCKS.

SPECIFICATION forming part of Letters Patent No. 769,601, dated September 6, 1904.

Application filed December 15, 1903. Serial No. 185,289. (No model.)

*To all whom it may concern:*

Be it known that I, JOHN ALBERT FERGUSON, a citizen of the United States, residing at Denver, in the county of Denver and State of Colorado, have invented certain new and useful Improvements in Molds for Building-Blocks; and I do declare the following to be a full, clear, and exact description of my invention, such as will enable others skilled in the art to which it appertains to make and use the same, reference being had to the accompanying drawings, forming a part of this specification, in which similar letters of reference indicate corresponding parts in both figures.

My invention relates to a class of molds adapted to be used for molding building-blocks for walls which are composed of cement or other suitable material.

The objects of my invention are to provide a mold that can be constructed with any suitable core, thus changing the form of the molded product, one that can be readily adjusted, and one that is simple in its construction and durable.

I refer now to the drawings in further explaining the nature and objects of my invention, in which—

Figure 1:
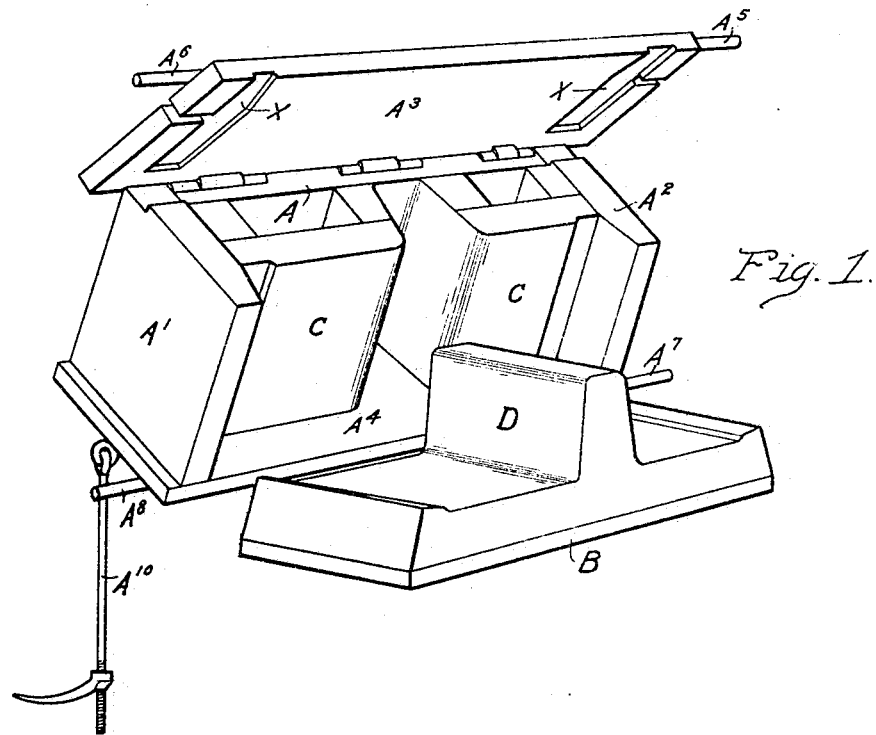
Figure 2:
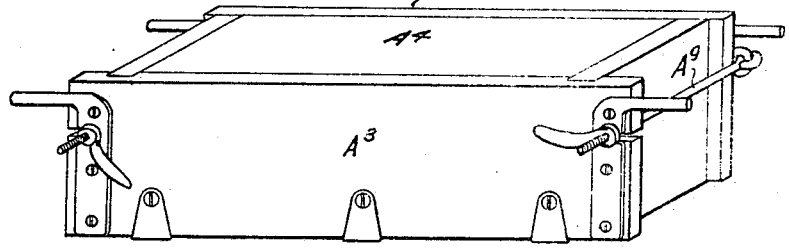

Figure 1 is a perspective view of my mold, showing the molded product released therefrom. Fig. 2 is a perspective view of the mold closed ready to receive the material.

In more fully referring to the drawings, A represents the bottom or base plate of the mold-box. A' and A² represent the end walls thereof.

A³ and A⁴ represent the side walls, one of which is hinged to the base-plate, (designated by A.) The side wall (designated by A³) is provided with recesses or indentations (designated by X) adapted to receive the edges of the end walls A' and A², as fully illustrated in the drawings. The side walls are provided with extensions or rods, (indicated by A⁵, A⁶, A⁷, and A⁸.) These extensions or rods are adapted to facilitate the handling of the mold.

A⁹ and A¹⁰ indicate rods or bolts by means of which the side walls are clamped together, said bolts being pivoted to the stationary or fixed wall A⁴ and having their threaded end portions passing through slots or openings formed in the wall A³ and engaging suitable clamping-nuts, so that when said nuts are adjusted the several parts of the mold will be drawn together in box form, as clearly illustrated in Fig. 2 of the drawings.

The top or presser plate of the mold, which is ordinarily constructed with a plane undersurface, is designated by B.

C indicates the core of the mold, which can be constructed of any suitable metal or material, as I do not confine myself to any one metal nor to any particular mode of constructing the core, but desire to secure by Letters Patent the principle involved and vary the construction according to the shape of the block that is desired and to use such material as will be found most practical and efficient for the uses and purposes for which it is adapted.

D indicates the product of the mold or a cement block adapted to be used for constructing walls for buildings. I do not claim anything as subject-matter of this application relating to said block.

It is obvious that the operation of my mold is simple and as follows: The mold is filled with material of which the blocks are to be made and the top or presser plate B placed thereon. It is then placed within a press suitable for the purpose and a heavy pressure brought to bear on the top of said mold. After it has received the desired amount of pressure it is removed from the press and the clamping-nuts on the rods or bolts unscrewed, thereby releasing the hinged side wall A³ and permitting the molded product to be readily removed from the box, as illustrated in Fig. 1 of the drawings.

Having thus described the nature and objects of my invention and the manner of constructing and applying the same, what I claim as new, and desire to secure by Letters Patent of the United States, is—

1. A mold-box having three fixed walls and one hinged wall, and a core member arranged within the box and engaging the base of the box and two of the fixed walls thereof.

2. A mold-box comprising a base-plate having end walls rigidly secured thereto, a stationary side wall secured to the end walls a core member supported by the base-plate, and a movable side wall pivoted to said base-plate.

3. A mold-box having three fixed walls and a movable side wall, a core member supported by the base of the box and a presser-plate forming a cover for said box.

4. A mold-box having a fixed side wall and a movable side wall, means for securing the movable side wall to the end walls of the box and a core member arranged within said box and supported by the base thereof.

5. A mold-box having a fixed side wall and a movable side wall, means for securing the movable side wall to the end walls of the box, a core member supported by the base of said box, and a presser-plate forming the top of the box and serving as a support for the block when the same is removed from the mold.

6. A mold-box comprising a base-plate, two fixed end walls, one fixed side wall, and one movable side wall hinged to the base-plate, means for clamping the movable side wall to the end walls, a presser-plate, and a core member arranged within the box and secured to said base-plate.

7. A mold-box comprising a base-plate, stationary end walls secured thereto, a movable side wall pivoted to one edge of the base-plate and a fixed side wall secured to the opposite edge thereof, and clamping-rods pivoted to the fixed side wall and engaging the opposite movable wall.

8. A mold-box comprising a base-plate having two end walls and one side wall rigidly secured thereto, a movable side wall hinged to the base-plate and provided with terminal slots or recesses, clamping-rods pivoted to the fixed side wall and engaging said slots or recesses, a presser-plate, and a core arranged within the mold-box.

9. A mold-box comprising a base-plate having end walls rigidly secured thereto, a stationary side wall, a movable side wall provided with slots or recesses, threaded rods pivoted to the stationary side wall and passing through the slots in the opposite movable wall, and clamping-nuts engaging the threaded ends of said rods.

In testimony that I claim the foregoing as my own I hereunto subscribe my name in the presence of two witnesses.

JOHN ALBERT FERGUSON.

Witnesses:
HARMON H. RICE,
ORA LASSWELL.